United States Patent [19]

Caimi et al.

[11] Patent Number: 5,164,587
[45] Date of Patent: Nov. 17, 1992

[54] POLARIMETRIC PARAMETER MEASUREMENT SYSTEMS AND METHODS FOR MEASURING A PLURALITY OF PARAMETERS

[75] Inventors: Frank M. Caimi, Vero Beach; Barry G. Grossman, Satellite Beach, both of Fla.; Ali T. Alavie, Toronto, Canada

[73] Assignees: Harbor Branch Oceanographic Institution, Inc., Ft. Pierce; The Florida Institute of Technology, Inc., Melbourne, both of Fla.

[21] Appl. No.: 757,030

[22] Filed: Sep. 9, 1991

[51] Int. Cl.$^5$ ............................................. H04B 10/00
[52] U.S. Cl. ................................. 250/227.17; 73/800
[58] Field of Search ................... 250/227.14, 227.16, 250/227.17, 231.10; 73/800; 356/32-34, 351

[56] References Cited

U.S. PATENT DOCUMENTS

| | | | |
|---|---|---|---|
| 4,173,412 | 11/1979 | Ramsay | 250/227.17 |
| 4,295,738 | 10/1981 | Meltz et al. | 73/800 |
| 4,564,289 | 1/1986 | Spillman, Jr. | 250/227.17 |
| 4,611,378 | 9/1986 | Caserta et al. | 356/32 |
| 4,642,458 | 2/1987 | Jackson et al. | 250/231.1 |
| 4,653,906 | 3/1987 | Dunphy et al. | 356/32 |
| 4,904,863 | 2/1990 | McDearmon | 250/227.17 |
| 4,947,693 | 8/1990 | Szuchy et al. | 73/800 |
| 5,062,153 | 10/1991 | Turpin et al. | 250/227.17 |
| 5,064,270 | 11/1991 | Turpin et al. | 73/800 |

Primary Examiner—David C. Nelms
Assistant Examiner—S. Allen
Attorney, Agent, or Firm—Carroll F. Palmer

[57] ABSTRACT

A systems for measuring the value of a plurality of parameters includes an optical fiber having a core that conducts coherent light along two orthogonal polarization axes at different velocities, e.g., an elliptical core, a light source for launching linearly polarized coherent light into such fiber to propagate therein as multimodes, a light splitter to divide the light that emerges from the optical fiber into a plurality of light portions, a mode stripper to remove the second order mode of light from the first light portion, a first polarizer to polarize such first light portion after it exits the mode stripper, a first photodetector to convert the polarized first light portion into a first electric signal, second polarizer to polarize a second light portion, a second photodetector to convert the polarized second light portion into a second electric signal, a signal processor to convert the first and second electric signals into a pair of analog voltages, and meters or the like to display such voltages as parameter values, e.g., strain and temperature. The systems may include a third polarizer and third photodetector to process a third light portion for a third parameter measurement, e.g., pressure. Parameter value measurement methods using the new systems are disclosed.

12 Claims, 2 Drawing Sheets

POLARIMETRIC PARAMETER MEASUREMENT SYSTEMS AND METHODS FOR MEASURING A PLURALITY OF PARAMETERS

BACKGROUND OF THE INVENTION

1. Field of the Invention

This application relates to systems and methods for measurement of a variety of parameters, e.g., strain, temperature, pressure, etc. More particularly, it concerns such systems and methods that comprise the combination of both polarimetric and a few-mode sensor in a single optical fiber to provide a large dynamic range in measuring a parameter without sacrificing sensitivty.

2. Description of the Prior Art

The use of optical fibers for the sensing of strain is well-known and this has been done in a variety of applications, e.g., see U.S. Pat. Nos. 4,295,738; 4,611,378; 4,653,906 and 4,947,693.

Several different classes of optical fiber sensors have been investigated, each having particular advantages and disadvantages. Two classes of particular interest are the polarimetric sensors and the so-called "few-mode" or bimodal sensors. In the polarimetric sensors, a birefringent fiber, i.e., an Andrew E-type fiber, is used to conduct two orthogonally polarized optical signals longitudinally along the fiber, each with a different propagation velocity. As the fiber is strained, a change in the relative optical path length results, thereby rotating the resultant polarization at the fiber output. The polarization rotation is then converted to an intensity variant signal using a linear polarizer at the output end. In a typical response with a polarimetric sensor, where the output intensity signal is plotted versus the induced strain nearly 2000 microstrain is required to observe a complete transition from minimum to maximum detected intensity.

The "few-mode" or bimodal sensor is unlike the polarimetric sensor in that polarization effects are not required for sensing strain. In this case, an optical fiber is used that will support two or more lower order propagation spatial modes. As the fiber is subjected to longitudinal strain, the effective propagation constant for each of the modes is altered in such a way that the relative phase between each mode is shifted in proportion to the strain. Thus, at the output end of the fiber, both modes interfere producing an intensity pattern in space which when detected at a particular point, varies in proportion to the induced strain. In a typical response, a 150 microstrain is sufficient to cause a complete transition from minimum to maximum detected intensity. As the applied strain is increased, the intensity pattern alternates through successive light/dark transitions.

OBJECTS

A principal object of the invention is the provision of new systems and methods for measurement of a variety of parameters, e.g., strain, temperature, pressure, etc.

Further objects include the provision of:

1. Parameter measurement systems that comprise both a polarimetric and a few-mode sensor in a single optical fiber to provide a large dynamic measurement range without sacrificing sensitivity.

2. Such systems that have the ability to simultaneously measure two parameters, e.g., strain and temperature, thereby having a sensor which can be compensated for changes in its response to one parameter due to variations in the other parameter under varying environmental conditions.

3. New strain measurements systems and methods that can be used to monitor strain in bridges, buildings, aircraft, space structures and vehicles, satellites, ocean vehicles and offshore drilling platforms and other ocean structures.

4. New parameter measurement systems and methods that can be used to measure strain, pressure, compression, temperature, electrical fields, magnetic fields and chemical features.

Other objects and further scope of applicability of the present invention will become apparent fromt the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of signal processing systems and methods which combine the features of polarimetric and few-mode sensors in a single fiber. In a preferred embodiment, a few-mode sensor scheme is utilized in conjunction with a polarimetric scheme in the same fiber. Linearly polarized coherent light is launched into a polarization maintaining optical fiber having an elliptical core with the transverse electric field oriented such that light propagates along each characteristic axis of propagation. Unlike a conventional polarimetric sensor, the fiber core dimensions are chosen such that each component of the input light along the fiber propagational axes is able to excite the fundamental LP01 mode and the next highest order LP11 mode. The fiber may be constructed such that the LP11 mode may be supported along one or both axes in the case of an elliptical-core fiber. In this way, each lower (LP01) mode is polarized along a corresponding axis of the fiber, while the higher order (LP11) mode may be associated with either the axis corresponding to the larger core dimension or to both axes. The former case comprises a combined polarimetric sensor and single axis bimodal sensor.

The objects of the invention are further attained by the provision of a new method for measuring the values of a plurality of parameters, e.g., strain and temperature, which comprises providing an optical fiber having a core that conducts coherent light along two orthogonal polarization axes at different velocities with an input end and an output end.

While some intensity values of the parameters being measured are imposed on the optical fiber, a beam of linearly polarized coherent light is launched into the fiber input end so that the light propagates as two modes in the optical fiber and exits the output end with a first portion of the coherent light polarized parallel to a first polarization axis of the fiber core and a second portion of the coherent light polarized parallel to the second polarization axis of the fiber core. The light exiting the fiber output end is split into a first light portion and a second light portion. The first light portion is passed through a second order mode stripper that removes the second order LP11 mode leaving only the first order mode LP01. The stripped light is then passed through a first polarizer and into a first photodetector that converts the light energy of the stripped light into a first electrical signal.

The second light portion is passed though a second polarizer and into a second photodetector that converts the light energy of the second split beam into a second electrical signal.

Finally, the first and second electrical signals are converted, e.g., by a signal processor, into electrical voltages that are a function of the values of the parameters being measured by the method.

In another method of the invention, the light exiting the fiber output end is split into a first light portion, a second light portion and a third light portion. The third light portion is processed like the second light portion as explained above to yield the value of a third parameter, e.g., pressure.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
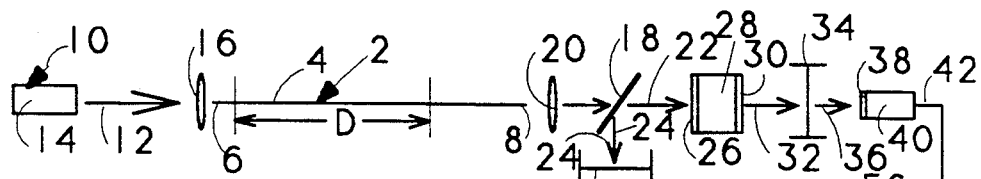
FIG. 1 is a diagrammatic representation of one embodiment of a parameter measurement system structured in accordance with the invention.

Referring in detail to the drawings, in a first embodiment shown in FIG. 1, the system 2 for measuring the value of a parameter comprises an optical fiber 4 having an input end 6 and an output end 8. By way of example, fiber 4 can be a Andrew E-type or Andrew D-type fiber having elliptical cores made and sold by the Andrew Corporation of Orland, Ill. Other types of useable fibers include so-called PANDA fibers. Bow Tie fibers, elliptical cladding fibers and other high linearly birefringent fibers that conduct coherent light along two orthogonal polarization axes at different velocities.

The portion D of the fiber 4 is the sensing region that is subjected to the parameter measured by system 2, e.g., strain and/or temperature.

Means 10 for launching linearly polarized coherent light 12 into the input end 6 to propagate as multimodes in the optical fiber 4 comprises a semiconductor laser 14 and a focusing lens 16.

Beams splitter 18 receives light that emerges from the output end 8 of the optical fiber 4 via lens 20 and splits the light into a first beam 22 and a second beam 24.

The beam 22 enters the input portion 26 of mode stripper 28 and exits the output portion 30 as beam 32 with the second order mode of light removed therefrom. Beam 32 passes through the plate polarizer 34 and emerges as polarized light beam 36 to irradiate the light receptor surface 38 of photodetector 40 which converts the light into an electric signal which exits via the signal output 42.

Beam 24 passes through the plate polarizer 44 and emerges as polarized light beam 46 to irradiate the light receptor surface 48 of photodetector 50 which converts the light into an electric signal which exits via the signal output 52.

System 2 further comprises a signal processor 54 comprising signal input 56 connected to the photodetector signal output 42 and signal input 58 connected to the photodetector signal output 52. Processor 54 also comprises signal outputs 60 and 62 connected to means 64 to utilize the electrical signals emitted therefrom, e.g., strain meter 66 and temperature meter 68.

In processor 54 the signals from photodetectors 40 and 50 are each inputs to processor 54 each to be converted into a ditigal signal by means of an analog-to-ditigal converter. The converter periodically in time samples the analog signal from each photodetector 40 and 50 and converts them into binary number representations (BNR1 and BNR2) for each sample. Each BNR is input to to a ditigal microprocessor which performs mathematical operations on each BNR according to a specific process. The first such operation substracts the current BNR1 or BNR2 from the immediately previous BNR1 or BNR2 which are the initial incremental parameter values stored in memory to obtain differences (DIF1 and DIF2). Ditigal numbers (DNS1 and DNS2) representative of the incremental parametric changes, e.g., in strain and temperature, are computed from each DIF1 and DIF2 by multiplying the vector composed of them by the inverted matrix composed of the prestored coefficients which are determined by the ratio of the incremental change in the intensity of light received at each photodetector to the incremental change of the parameter to be measured. This matrix of coefficients is determined by the physical charatertics and construction of the fiber 4 which are considered constants and prestored in the signal processor memory.

The DNS1 and DNS2 are then added separately to previously computed ditigal representations of the total strain and temperature BNRn1 and BNRn2 to obtain a corrected BNRn1 and BNRn2. After this addition process, these binary number representations are converted to output signals by a digital to analog converter and feed to meters 66 and 68. This signal computation process is repeated for each sample point in time.

In system 2, beam 46 if viewed on a flat surface consists of a pair of adjacent lobes representing the 2 mode of light issuing from the x axis of the fiber 4 (or the y axis if polarizer 44 is differently positioned). Beam 36 if viewed on a flat surface consists of a single lobe representing the 1st mode of light issuing from both the x and y axes of fiber 4. The photodetector 40 is positioned relative to beam 36 so that the single lobe of beam 36 impinges on receptor surface 38. In contrast, photodetector 50 is positioned relative to beam 46 so that only one of the two lobes of beam 46 impinges on receptor surface 48.

Figure 2:
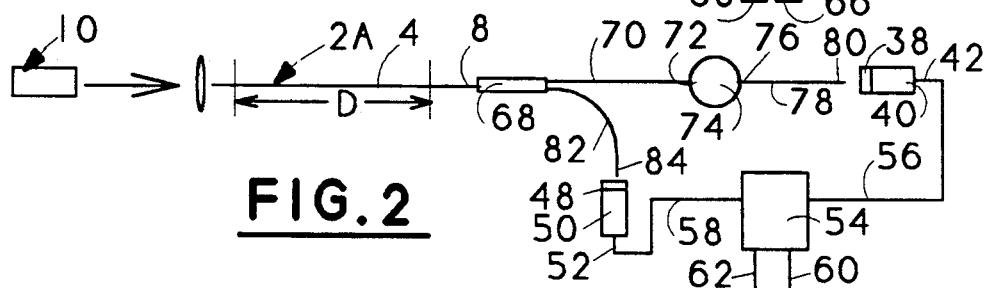
FIG. 2 is a diagrammatic representation of a second embodiment of a parameter measurement system structured in accordance with the invention.

In the system 2A of FIG. 2, some of the conventional optical components of system 2, e.g., beam splitter 18, polarizers 34 and 44 etc., are replaced with comparably functional optical fiber components.

The system 2A mimics system 2 up to the output end 8 which connects with a 3dB coupler 68 that splits the light emitted from fiber output 8 into first and second light portions.

First light portion travels along optical fiber 70 to the input 72 of mode stripper 74, which is in substance a tightly wound coil of an optical fiber that serves to block passage of the second mode LP11 of the first light portion. The mode stripped light portion exits the stripper 74 via output 76 and passes through the fiber polarizer 78 to exit output end 80 and irradiate the light receptor surface 38 of photodetector 40 which converts the light into an electric signal which exits via the signal output 42.

The second light portion from coupler 68 passes through fiber polarizer 82 to exit its output end 84 and irradiates the light receptor surface 48 of photodetector 50 which converts the light into an electric signal which exits via the signal output 52.

The remainder of system 2A mimics that of system 2.

In system 2A, light from output end 84 if viewed on a flat surface consists of a pair of adjacent lobes representing the 2 mode of light issuing from the x axis of the fiber 4. Light from output end 80 if viewed on a flat surface consists of a single lobe representing the 1st mode of light issuing from both the x and y axes of fiber 4. The photodetector 40 is positioned relative to end 80 so that the single lobe therefrom impinges on receptor surface 38. In contrast, photodetector 50 is positioned relative to output end 84 so that only one of the two lobes of the beam emitted therefrom impinges on receptor surface 48.

Figure 3:
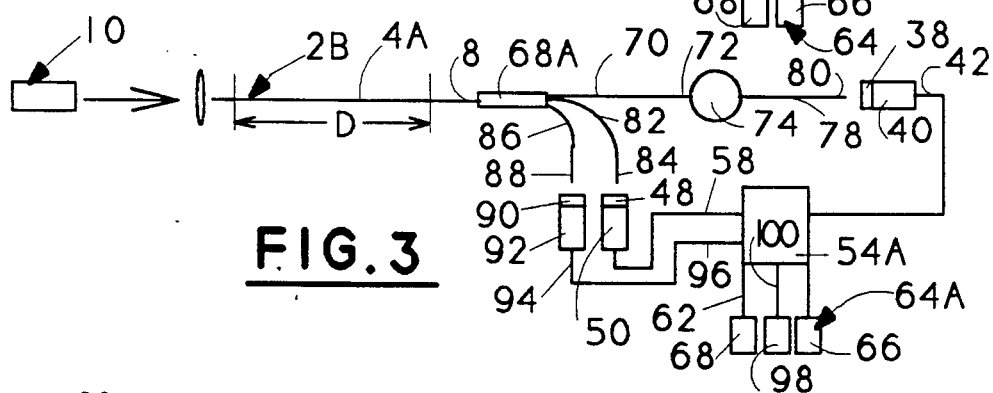
FIG. 3 is a diagrammatic representation of a third embodiment of a parameter measurement system structured in accordance with the invention.

The system 2B of FIG. 3 is similar to system 2A, but posseses a third light portion provided by coupler 68A making it possible for the system 2B to measure a third parameter, e.g., pressure. In order to do this, the optical fiber 4A may be different from fiber 4 used in systems 2 and 2A. For example, fiber 4A may include a special cladding to render it sensitive to the third parameter.

Figure 4:
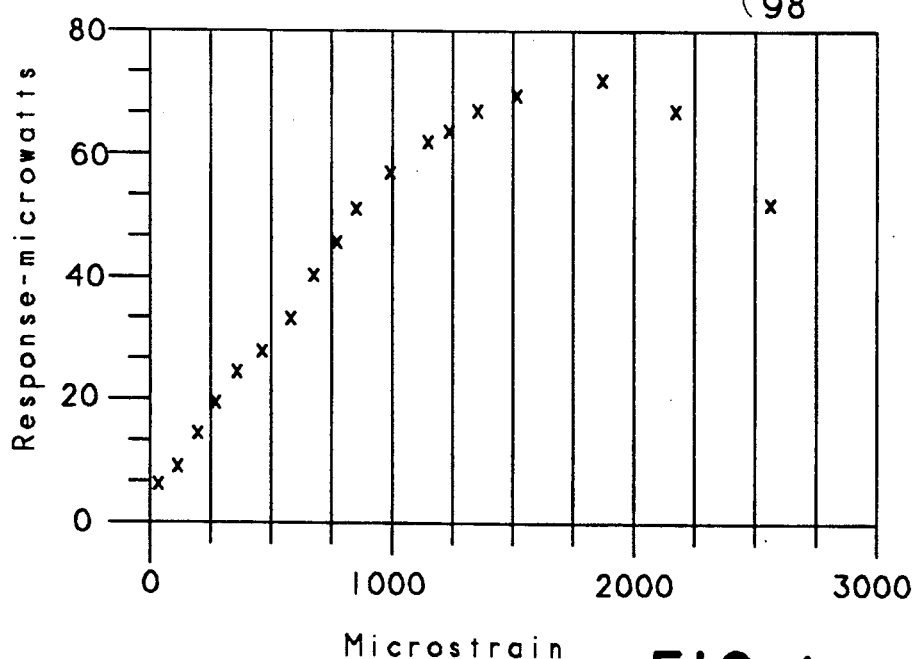
FIG. 4 is a graph showing the output signal versus the induced strain imposed on a Andrew E-type optical fiber in a polarimetric type strain sensor.
Figure 5:
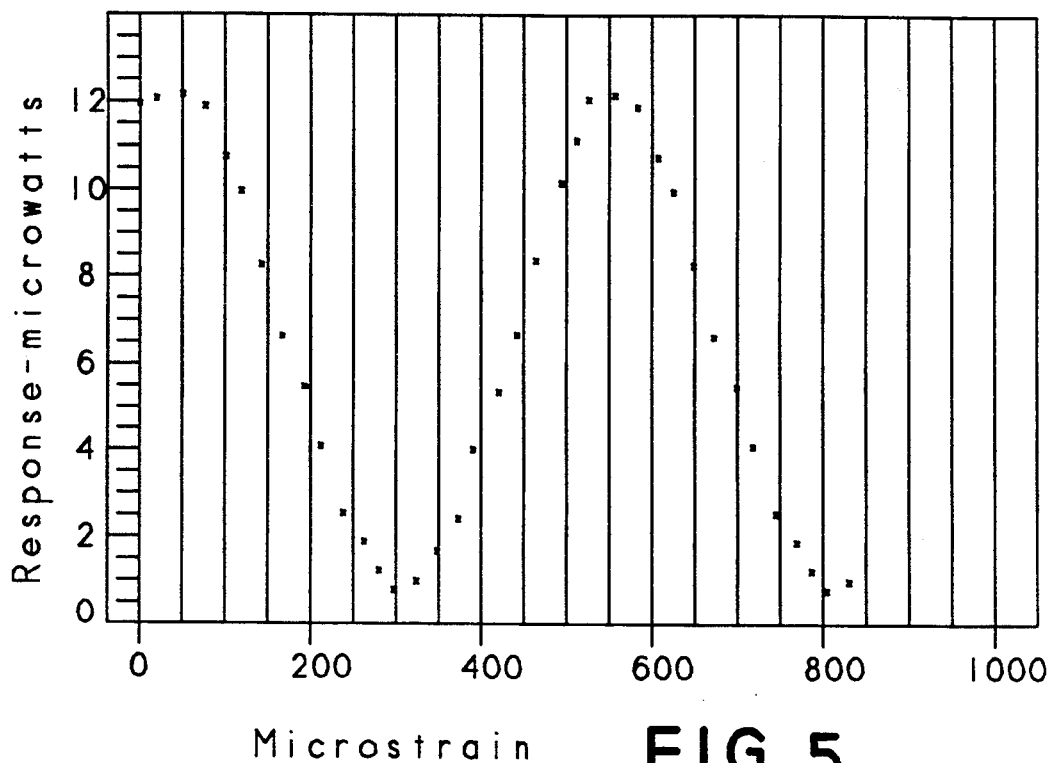
FIG. 5 is a graph showing the output signal versus the induced strain imposed on a Andrew E-type optical fiber in a 2 mode-x type strain sensor with polarization parallel to the major axis.
Figure 6:
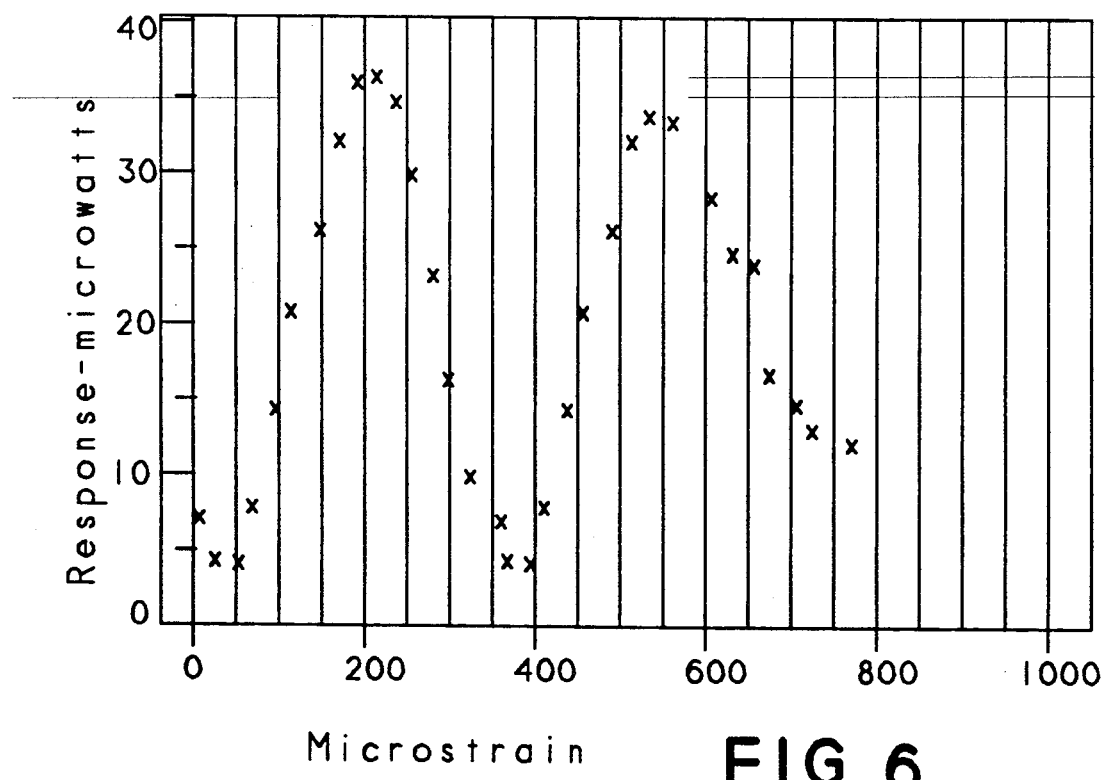
FIG. 6 is a graph showing the output signal versus the induced strain imposed on a Andrew E-type optical fiber in a 2 mode-x type strain sensor with polarization parallel to the minor axis.

The system 2B includes a fiber polarizer 86 which passes a third light portion from coupler 68A to exit its end 88 and irradiate the light receptor surface 90 of photodetector 92 which converts the light into an electric signal which exits via the signal output 94 to pass by signal input 96 into the signal processor 54A. The type of data being fed into processor 54A via input 56 is typified by FIG. 4, that being fed via input 58 is typified by FIG. 5 and that being fed via input 96 is typified by FIG. 6.

In system 2B, the means 64A includes a third meter 98 connected to signal processor by line 100 to report the value of the third parameter being measured by system 2B, e.g., pressure.

In system 2B, light from output end 84 if viewed on a flat surface consists of a pair of adjacent lobes representing the 2 mode of light issuing from the x axis of the fiber 4 and light from output end 88 if viewed on a flat surface consists of a pair of adjacent lobes representing the 2 mode of light issuing from the y axis of the fiber 4. Light from output end 80 if viewed on a flat surface consists of a single lobe representing the 1st mode of light issuing from both the x and y axes of fiber 4. The photodetector 40 is positioned relative to end 80 so that the single lobe therefrom impinges to output end 84 so that only one of the two lobes of the beam emitted therefrom impinges on receptor surface 48 and photodetector 92 is positioned relative to output end 88 so that only one of the two lobes of the beam emitted therefrom impinges on receptor surface 90.

We claim:

1. A system for measuring the value of a plurality of parameters which comprises:
    an optical fiber having an input end, an output end and a core that conducts coherent light along two orthogonal polarization axes at different velocities,
    means for launching linearly polarized coherent light into said input end to propagate as multimodes in said optical fiber,
    a light splitter arranged to be irradiated with light that emerges from said output end of said optical fiber and split said light into a first light portion and a second light portion,
    a mode stripper having a input portion and an output portion arranged so said first light portion enters said input portion and exits said output portion with the second order mode of light removed from said first light portion,
    first polarizer means to polarize said first light portion after it exits said mode stripper,
    a first photodetector comprising a light receptor surface and a signal output arranged to have said polarized first light portion irradiate said first photodetector light receptor surface,
    second polarizer means to polarize said second light portion,
    a second photodetector comprising a light receptor surface and a signal output arranged to have said polarized second light portion irradiate said second photodetector light receptor surface,
    a signal processor comprising first and second signal inputs and first and second processor outputs,
    said first signal input being connected to said first photodetector signal output and said second signal input being connected to said second photodetector signal output and
    means connected to said first and second processor outputs to utilize the electrical signals emitted therefrom.

2. The system of claim 1 wherein said means connected to said first and second processor outputs consists of a strain meter connected to one of said processor outputs and a temperature meter connected to the other of said processor outputs.

3. The system of claim 1 wherein said first and second polarizer means are respectively first and second optical fiber polarizers each having an input end and an output end.

4. The system of claim 1 wherein said first and second polarizer means are respectively first and second polarizer plates.

5. The system of claim 1 wherein a parameter measured thereby is structural strain.

6. The system of claim 1 wherein a parameter measured thereby is temperature.

7. The system of claim 1 wherein said beam splitter means is a partially light transmissive plate.

8. The system of claim 1 wherein said beam splitter means is a 3dB coupler.

9. The system of claim 1 wherein said optical fiber has an elliptical core.

10. A system for measuring the value of a parameter which comprises:
    an optical fiber having an input end, an output end and a core that conducts coherent light along two orthogonal polarization axes at different velocities,
    means for launching linearly polarized coherent light into said input end to propagate as multimodes in said optical fiber, a light splitter arranged to be irradiated with light that emerges from said output end of said optical fiber and split said light into a first light portion, a second light portion and a third light portion, a mode stripper having a input portion and an output portion arranged so said first light portion enters said input portion and exits said output portion with the second order mode of light removed from said first light portion, first polarizer means to polarize said first light portion after it exits said mode stripper, a first photodetector comprising a light receptor surface and a signal output arranged to have said polarized first light portion irradiate said first photodetector light receptor surface, second polarizer means to polarize said second light portion, a second photodetector comprising a light receptor surface and a signal output arranged to have said polarized second light portion irradiate said second photodetector light receptor surface, third polarizer means to polarize said third light portion, a third photodetector comprising a light receptor surface and a signal output arranged to have said polarized third light portion irradiate said third photodetector light receptor surface, a signal processor comprising first, second and third signal inputs and first, second and third processor outputs, said first signal input being connected to said first photodetector signal output, said second signal input being connected to said second photodetector signal output and said third signal input being connected to said third photodetector signal output means connected to said first, second and third processor outputs to utilize the electrical signals emitted therefrom.

11. The method of measuring the value of a plurality of parameters which comprises:

providing an optical fiber having an input end, an output end and a core that conducts coherent light along two orthogonal polarization axes at different velocities, imposing some intensity value of said parameter on said optical fiber, launching a beam of linearly polarized coherent light into said input end so that said light propagates as two modes in said optical fiber and exits said output end with a first portion of said coherent light polarized parallel to a first polarization axis of said fiber core and a second portion of said coherent light polarized parallel to a second polarization axis of said fiber core, splitting the light exiting said fiber output end into at least a first light portion and a second light portion, passing said first light portion through a second order mode stripper, next through a polarizer and then into a photodetector that converts the light energy of said first light portion into a first electrical signal, passing said second light portion though a polarizer and then into a photodetector that converts the light energy of said second light portion into a second electrical signal, and converting said first and second electrical signals into a electrical voltage that is a function of the value of first and second parameters being measured by said method.

12. The method of claim 11 wherein the light exiting said fiber output end is split into a first light portion, a second light portion and a third light portion, said third light portion is passed though a polarizer and then into a photodetector that converts the light energy of said third light portion into a third electrical signal, and said third electrical signal is converted into an electrical voltage that is a function of the value of a third parameter being measured by said method.

* * * * *